United States Patent
S Bykampadi et al.

(10) Patent No.: US 12,004,059 B2
(45) Date of Patent: Jun. 4, 2024

(54) ENHANCED IDENTIFICATION IN COMMUNICATION NETWORKS

(71) Applicant: Nokia Technologies Oy, Espoo (FI)

(72) Inventors: Nagendra S Bykampadi, Bangalore (IN); Jani Petteri Ekman, Kangasala (FI); Anja Jerichow, Grafing bei München (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 273 days.

(21) Appl. No.: 17/363,975

(22) Filed: Jun. 30, 2021

(65) Prior Publication Data

US 2022/0014888 A1 Jan. 13, 2022

(30) Foreign Application Priority Data

Jul. 9, 2020 (IN) .............................. 202041029205

(51) Int. Cl.
*H04W 4/50* (2018.01)
*H04W 12/069* (2021.01)
*H04W 12/76* (2021.01)

(52) U.S. Cl.
CPC ........... *H04W 4/50* (2018.02); *H04W 12/069* (2021.01); *H04W 12/76* (2021.01)

(58) Field of Classification Search
CPC ...... H04W 12/76; H04W 12/069; H04W 4/50
See application file for complete search history.

(56) References Cited

U.S. PATENT DOCUMENTS

2020/0153707 A1* 5/2020 Lu ........................... H04L 43/55
2021/0392477 A1* 12/2021 Taft ........................ H04W 12/37
2022/0264301 A1* 8/2022 Martinez De La Cruz ................. H04W 12/069

FOREIGN PATENT DOCUMENTS

| KR | 20190088878 A | 7/2019 |
| WO | 2019//034609 A1 | 2/2019 |

(Continued)

OTHER PUBLICATIONS

Extended European Search Report received for corresponding European Patent Application No. 21183457.7, dated Dec. 17, 2021, 11 pages.

(Continued)

*Primary Examiner* — Elton Williams
(74) *Attorney, Agent, or Firm* — Robert P. Michal, Esq.; Carter, DeLuca & Farrell LLP (57) ABSTRACT

According to an example aspect of the present invention, there is provided a method comprising receiving, by a network repository function, a request from a network function, wherein the request comprises a string associated with an instance identity of the network function, determining, by the network repository function, a type of the instance identity of the network function from a set of instance identity types, determining, by the network repository function, the instance identity of the network function based on the string associated with the instance identity of the network function and the type of the instance identity of the network function and transmitting, by the network repository function, a response to the network function, wherein the response depends on whether the instance identity of the network function was found in a list of network function instances registered at the network repository function.

16 Claims, 5 Drawing Sheets

(56) References Cited

FOREIGN PATENT DOCUMENTS

| WO | 2019/138133 A1 | 7/2019 |
|---|---|---|
| WO | 2019/223855 A1 | 11/2019 |
| WO | 2020/030291 A1 | 2/2020 |

OTHER PUBLICATIONS

"3rd Generation Partnership Project; Technical Specification Group Services and System Aspects; Study on Architecture for Next Generation System (Release 14)", 3GPP TR 23.799, V14.0.0, Dec. 2016, pp. 1-522.

"3rd Generation Partnership Project; Technical Specification Group Core Network and Terminals; 5G System; Common Data Types for Service Based Interfaces; Stage 3 (Release 16)", 3GPP TS 29.571, V16.4.0, Jun. 2020, pp. 1-121.

"3rd Generation Partnership Project; Technical Specification Group Core Network and Terminals; Numbering, addressing and identification; (Release 16)", 3GPP TS 23.003, V16.3.0, Jun. 2020, pp. 1-141.

"3rd Generation Partnership Project; Technical Specification Group Core Network and Terminals; 5G System; Common Data Types for Service Based Interfaces; Stage 3 (Release 16)", 3GPP TS 29.571, V16.3.0, Mar. 2020, pp. 1-100.

"3rd Generation Partnership Project; Technical Specification Group Core Network and Terminals; Numbering, addressing and identification; (Release 16)", 3GPP TS 23.003, V16.2.0, Mar. 2020, pp. 1-140.

"3rd Generation Partnership Project; Technical Specification Group Core Network and Terminals; 5G System; Network Function Repository Services; Stage 3 (Release 16)", 3GPP TS 29.510, V16.3.0, Mar. 2020, pp. 1-172.

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

"SPIFFE Overview", Spiffe, Retrieved on Jun. 25, 2021, Webpage available at : https://spiffe.io/docs/latest/spiffe-about/overview/.

"SPIFFE Concepts", Spiffe, Retrieved on Jun. 25, 2021, Webpage available at : https://spiffe.io/docs/latest/spiffe-about/spiffe-concepts/.

Leach et al., "A Universally Unique IDentifier (UUID) URN Namespace", RFC 4122, Network Working Group, Jul. 2005, pp. 1-32.

"3rd Generation Partnership Project; Technical Specification Group Services and System Aspects; Security architecture and procedures for 5G system (Release 16)", 3GPP TS 33.501, V16.2.0, Mar. 2020, pp. 1-227.

"Secure Production Identity Framework for Everyone (SPIFFE)", GitHub, Retrieved on Jun. 25, 2021, Webpage available at : https://github.com/spiffe/spiffe/blob/main/standards/SPIFFE.md.

"The SPIFFE Identity and Verifiable Identity Document", GitHub, Retrieved on Jun. 25, 2021, Webpage available at : https://github.com/spiffe/spiffe/blob/main/standards/SPIFFE-ID.md.

"3rd Generation Partnership Project; Technical Specification Group Core Network and Terminals; 5G System; Technical Realization of Service Based Architecture; Stage 3 (Release 16)", 3GPP TS 29.500, V16.4.0, Jun. 2020, pp. 1-79.

Office action received for corresponding Indian Patent Application No. 202041029205, dated Jan. 28, 2022, 6 pages.

\* cited by examiner

ENHANCED IDENTIFICATION IN COMMUNICATION NETWORKS

FIELD

Various example embodiments relate in general to communication networks, such as core networks of cellular communication systems, and more specifically, to enhancing identification in such networks.

BACKGROUND

Identification is needed in various communication networks to ensure that users and network entities can be identified properly. For example, in core networks of cellular communication systems, such as in 5G core networks developed by the 3rd Generation Partnership Project, 3GPP, Network Functions, NFs, and NF instances need to be identified. The 3GPP still develops 5G core networks and there is a need to provide improved methods, apparatuses and computer programs for enhancing identification in 5G core networks, and in other networks in the future as well.

SUMMARY

According to some aspects, there is provided the subject-matter of the independent claims. Some example embodiments are defined in the dependent claims.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect of the present invention, there is provided a method comprising receiving, by a network repository function, a request from a network function, wherein the request comprises a string associated with an instance identity of the network function, determining, by the network repository function, a type of the instance identity of the network function from a set of instance identity types, determining, by the network repository function, the instance identity of the network function based on the string associated with the instance identity of the network function and the type of the instance identity of the network function and transmitting, by the network repository function, a response to the network function, wherein the response depends on whether the instance identity of the network function was found in a list of network function instances registered at the network repository function.

Example embodiments of the first aspect may comprise at least one feature from the following bulleted list or any combination of the following features:

- the type of the instance identity of the network function defines an identity type to be used for interpreting the string associated with the instance identity of the network function;
- the set of instance identity types comprises a Universally Unique Identifier, UUID, identity type;
- the set of instance types comprises an identity type for service mesh technologies;
- the identity type for service mesh technologies comprises a Secure Production Identity Framework for Everyone, SPIFFE, identity type;
- the type of the instance identity of the network function is determined based on the request;
- the request comprises an indication indicating that the type of the instance identity of the network function is the SPIFFE identity type;
- determining, responsive to determining that the request does not comprise an indication about the type of the instance identity of the network function, that the type of the instance identity of the network function is the UUID identity type;
- the network function operates according to at least one standard specification defined by a 3rd Generation Partnership Project, 3GPP;
- the network function is in a core network of a cellular communication network;
- the core network is a 5G core network.

According to a second aspect of the present invention, there is provided a method comprising determining, by a network function, a string associated with an instance identity of the network function, determining, by the network function, a type of the instance identity of the network function from a set of instance identity types and transmitting a request to a network repository function, wherein the request comprises the string associated with the instance identity of the network function.

Example embodiments of the second aspect may comprise at least one feature from the following bulleted list or any combination of the following features:

- the type of the instance identity of the network function defines an identity type to be used for interpreting the string associated with the instance identity of the network function;
- the set of instance identity types comprises a Universally Unique Identifier, UUID, identity type;
- the set of instance types comprises an identity type for service mesh technologies;
- the identity type for service mesh technologies comprises a Secure Production Identity Framework for Everyone, SPIFFE, identity type;
- the type of the instance identity of the network function is to be determined based on the request;
- the request comprises an indication indicating that the type of the instance identity of the network function is the SPIFFE identity type;
- transmitting, responsive to determining that the type of the instance identity of the network function is the UUID identity type, the request without the type of the instance identity of the network function;
- the network repository function operates according to at least one standard specification defined by a 3rd Generation Partnership Project, 3GPP;
- the network repository function is in a core network of a cellular communication network;
- the core network is a 5G core network.

According to a third aspect of the present invention, there is provided an apparatus, comprising one or more processors, and memory storing instructions that, when executed by the one or more processors, cause the apparatus to perform the first method. The at least one memory and the computer program code may be configured to, with the at least one processing core, cause the apparatus at least to perform, receive, by a network repository function, a request from a network function, wherein the request comprises a string associated with an instance identity of the network function, determine, by the network repository function, a type of the instance identity of the network function from a set of instance identity types, determine, by the network repository function, the instance identity of the network function based on the string associated with the instance identity of the network function and the type of the instance identity of the network function and transmit, by the network repository function, a response to the network function, wherein the response depends on whether the instance identity of the network function was found in a list of network function instances registered at the network repository function.

According to a fourth aspect of the present invention, there is provided an apparatus, comprising one or more processors, and memory storing instructions that, when executed by the one or more processors, cause the apparatus to perform the second method. The at least one memory and the computer program code may be further configured to, with the at least one processing core, cause the apparatus at least to perform, receive, determine, by a network function, a string associated with an instance identity of the network function, determine, by the network function, a type of the instance identity of the network function from a set of instance identity types and transmit a request to a network repository function, wherein the request comprises the string associated with the instance identity of the network function.

According to a fifth aspect of the present invention, there is provided an apparatus, comprising means for performing the first method. The apparatus may comprise means for receiving, by a network repository function, a request from a network function, wherein the request comprises a string associated with an instance identity of the network function, means for determining, by the network repository function, a type of the instance identity of the network function from a set of instance identity types, means for determining, by the network repository function, the instance identity of the network function based on the string associated with the instance identity of the network function and the type of the instance identity of the network function and means for transmitting, by the network repository function, a response to the network function, wherein the response depends on whether the instance identity of the network function was found in a list of network function instances registered at the network repository function.

According to a sixth aspect of the present invention, there is provided an apparatus, comprising means for performing the second method. The apparatus may comprise means for determining, by a network function, a string associated with an instance identity of the network function, means for determining, by the network function, a type of the instance identity of the network function from a set of instance identity types and means for transmitting a request to a network repository function, wherein the request comprises the string associated with the instance identity of the network function.

According to a seventh aspect of the present invention, there is provided non-transitory computer readable medium having stored thereon a set of computer readable instructions that, when executed by at least one processor, cause an apparatus to at least perform the method of the first aspect. According to an eighth aspect of the present invention, there is provided non-transitory computer readable medium having stored thereon a set of computer readable instructions that, when executed by at least one processor, cause an apparatus to at least perform the method of the second aspect.

According to a ninth aspect of the present invention, there is provided a computer program configured to perform the method of the first aspect. According to a tenth aspect of the present invention, there is provided a computer program configured to perform the method of the second aspect.

EXAMPLE EMBODIMENTS

Identification may be enhanced by the procedures described herein for example for Network Functions, NFs, in communication networks, such as in 5G core networks or other core networks. At least in the case of 5G core networks, flexibility would be beneficial and hence, a flexible framework for identification is provided. NFs may be identified by a NF instance Identity, ID, (NFInstanceID). The NFInstanceID may be defined as a combination of a string associated with the NFInstanceID and a type of the NFInstanceID. For a certain NFInstanceID, the type may be selected from a set of possible NFInstanceID types. For example, the set of possible NFInstance types may comprise at least Universally Unique Identifier, UUID, and Secure Production Identity Framework for Everyone, SPIFFE, identity types. Then, the NFInstanceID may be determined based on the string associated with the NFInstanceID and the type of the NFInstanceID, thereby providing a flexible scheme for identification.

Figure 1:
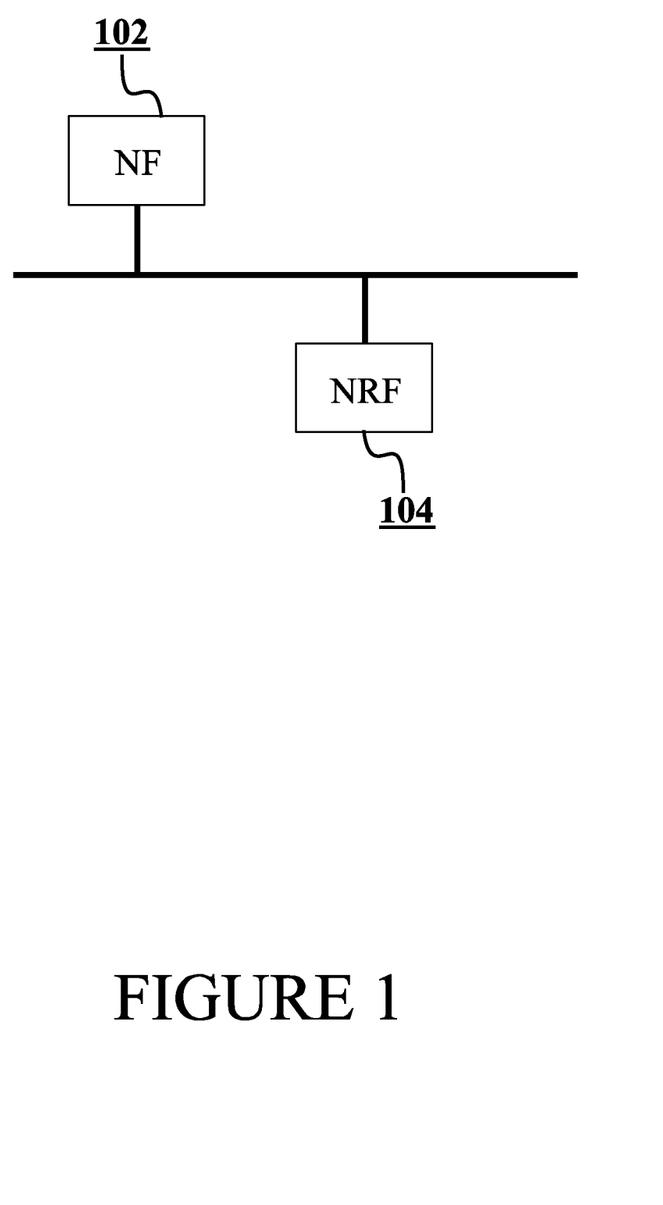
FIG. 1 illustrates an example system in accordance with at least some example embodiments.

FIG. 1 illustrates an example system in accordance with at least some example embodiments of the present invention. The example system of FIG. 1 comprises NF 102, which may refer to an operational and/or a physical entity. NF 102 may be a specific network node or element, or a specific function or set of functions carried out by one or more entities, such as Virtualized Network Functions, VNFs. At least some embodiments of the present invention may be applied in containerized deployments as well. One physical node may be configured to perform plural NFs. Examples of such network functions include a (radio) access or resource control or management function, session management or control function, interworking, data management or storage function, authentication function or a combination of one or more of these functions. In general, in accordance with embodiments of the present invention, NF 102 may also refer to a Service Communication Proxy, SCP, having a delegated role on behalf of a NF consumer,NFc, or NF producer,NFp. That is to say, the SCP may be configured to perform at least some actions of an NF and hence considered as NF 102.

In case of a 3$^{rd}$ Generation Partnership Project, 3GPP, Service-Based Architecture, SBA, of 5G core networks, NF 102 may comprise at least some of an Access and Mobility Function, AMF, a Session Management Function, SMF, a Network Slice Selection Function, NSSF, a Network Exposure Function, NEF, an Network Repository Function, NRF, a Unified Data Management, UDM, an Authentication Server Function, AUSF, a Policy Control Function, PCF, an Application Function, AF, Operations Administration and Maintenance, OAM, and Network Data Analysis Function, NWDAF.

NF 102 or instances of NF 102 may offer services to other NFs or NF instances. In order for a requested NF type, NF service or NF service instance to be discovered via NRF 104, the NF instance needs to be registered in NRF 104. After registration, NRF 104 maintains NF profiles of available NF instances and their supported services.

NF 102 may be identified by an instance identity of NF 102, i.e., NFinstanceID of NF 102. An information element NFInstanceID may be, along with other information elements, included in the profile of NF 102 at NRF 104. The information element NFInstanceID and other IEs included in the NF profile maintained at NRF 104 may be specified for example in the 3GPP standard specification TS 23.501 (clauses 6.2.6 and 6.3.1) and in the 3GPP standard specification TS 29.510.

Embodiments of the present invention provide improvements concerning identification in communication networks, such as NFInstanceIDs in 5G core networks for example. More specifically, flexibility of such networks is enhanced. For instance, flexibility of service meshes and other similar cloud-native deployments can be improved. Service mesh describes a network of microservices, in which applications are shared and interaction between the applications is possible. To gain operational control over such distributed microservice architecture, a service needs to be identified. Embodiments of the present invention therefore improve flexibility that a service mesh or other similar cloud-native deployments could offer by enhancing identification. So in general the challenge is how to improve flexibility of communication networks, e.g., 5G core networks, and provide flexible identification in such networks.

For example, the NFInstanceID format currently defined in 3GPP standard specifications TS 23.003 (clause 28.13) and TS 29.571 (clause 5.4.2) is limited to be a string uniquely identifying a NF instance to one specific type, which is the UUID version 4, as described in IETF RFC 4122. Alternatively, UUID version 5 may be used when randomly or pseudo-randomly generated v4 UUIDs cannot be used but manual configuration is preferred instead. However, currently 3GPP standard specifications TS 23.003, TS 29.571 and TS 29.510 define only the UUID v4 to be used. The UUID (a string without any inbuilt structure or hierarchy related to single or multiple trust domains does) not tell anything about the NF type though which might be desirable in the identifier as well. Due to these limitations, the flexibility that a service mesh or other similar cloud-native deployments could offer by integrating different types of services across heterogeneous environments (and in case of 5G across different operator domains) is limited. Hence there is a need to provide flexible scheme for identifying NFs and instances of NFs.

In order to allow flexible service identification via the NFInstanceID, the NFInstanceID may be enhanced to support multiple identity types without bounding it to Istio service mesh but can also be realized with AWS, Azure or similar. In order to make this path easier, e.g., for 3GPP 5GC eSBA, the available NF identity related concepts may be enhanced to better fit into the service mesh and cloud-native worlds.

In some embodiments, a set of supported, possible identity types may comprise the UUID identity type. Alternatively, or in addition, the set of identity types may comprise the SPIFFE identity type, for example as defined on the website "https://github.com/spiffe/spiffe/blob/master/standards/SPIFFE-ID.md" (retrieved on Jul. 6, 2020). The set of identity types may be defined in the 3GPP standards. So the SPIFFE identity type may be integrated into the 3GPP standards for example. NF 102 may use the supported identity types for identifying NF instances of NF services or an NF service set. In some embodiments, a structured data type is defined instead of a simple data type string, thereby allowing usage of other NF identity types/alternatives in the future as well.

Figure 2:
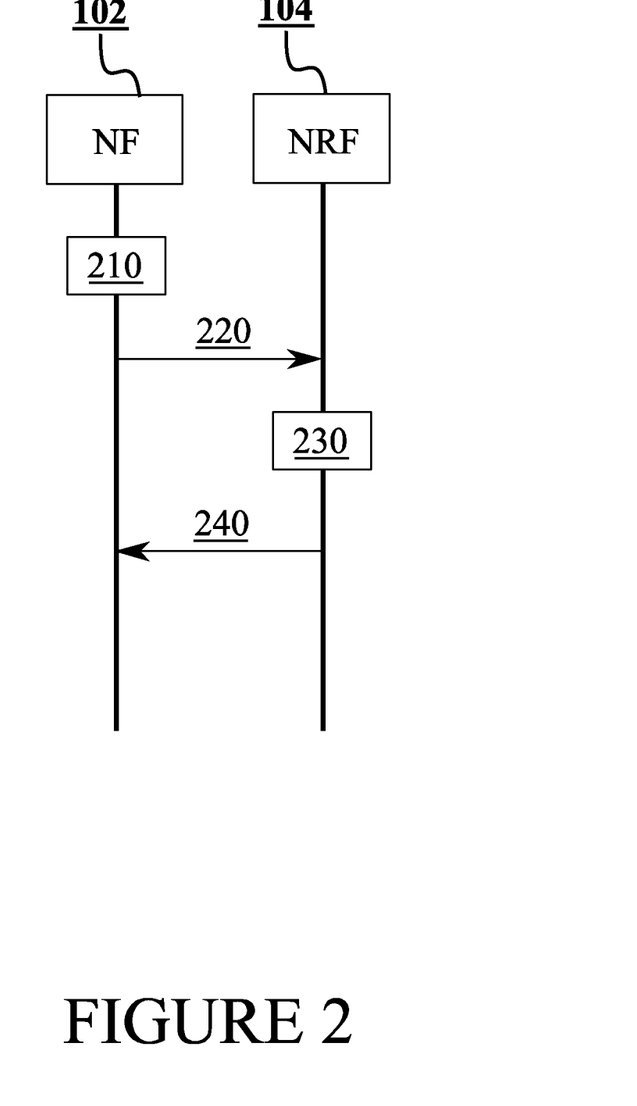
FIG. 2 illustrates signalling in accordance with at least some example embodiments.

FIG. 2 illustrates signalling in accordance with at least some example embodiments. On the vertical axes are disposed, from the left to the right, NF 102 and NRF 104. Time advances from the top towards the bottom.

At Step 210, NF 102 may determine a string associated with the NFInstanceID of NF 102. In addition, NF 102 may determine a type of the NFInstanceID of NF 102 from a set of instance ID types. The type of the NFInstanceID of NF 102 may define an identity type, such as UUID or SPIFFE ID, to be used for interpreting the string associated with the NFInstanceID of NF 102. The NFInstanceID of NF 102 may be defined as a combination of the string associated with the NFInstanceID and the type of the NFInstanceID of NF 102. Thus, various instance identity types may be supported. The set of instance ID types may comprise for example UUID and SPIFFE ID types. In some embodiments, the set of instance ID types may comprise for example {UUID, SPIFFE ID, OTHERS}. For example, in URI format the UUID may be defined as "urn:uuid:<uuid-v4-or-v5>" and the SPIFFE ID may be defined as SPIFFE-ID: "spiffe://<trust domain>/<workload identifier>"

NF 102 may get the NFInstanceID of NF 102, e.g., in the format of UUID for backward compatibility or in the format of SPIFFE ID. The SPIFFE ID may cover e.g., trust domain (or locality), UUIDv4/v5, NF Type, and potentially also service names as part of the SPIFFE workload identity in SPIFFE Verifiable Identity Document, SVID. This brings enough uniqueness for the SPIFFE IDs in a single HPLMN for instance. For instance, a certificate of NF 102 may include the assigned NFInstanceID of NF 102 or multiple NFInstanceIDs of NF 102 if applicable for a target deployment architecture. In some embodiments, one NF instance may have multiple SPIFFE IDs. In case that there are multiple different NF instances (of different NF types) behind a HTTP/2 reverse proxy, there may be multiple NFInstanceIDs as well, but not in the certificates (as that may cause rather complex certificates life-cycle management for NFs).

At step 220, NF 102 may transmit a request to NRF 104, wherein the request may comprise the string associated with the NFInstanceID of NF 102. In some embodiments, there may be one or more intermediate forwarding or redirecting NRF nodes which proxy the requests, such as Nnrf Service API requests, to the target NRF managing the NFProfile data for the requester. For example, if NF 102 is an NF producer instance, the request may be related to NF instance registration, NF profile complete replacement, NF profile partial update, NF heartbeat, NF instance deregistration. Alternatively, the request may be an access token request. NRF 104 may thus receive the request from NF 102 at step 220. For requests of NF consumers with NFDiscover, a SCP may handle all NRF related operations for NFp and NFc, e.g., for indirect communication model with Option D.

In some embodiments, NF 102 may indicate the type of the NFInstanceID of NF 102 implicitly. For instance, NF 102 may determine that the type of the NFInstanceID of NF 102 is the UUID identity type and in such a case transmit the request without the type of the NFInstanceID of NF 102.

However, if NF 102 determines that the type of the NFInstanceID of NF 102 is the SPIFFE identity type, NF 102 may add an indication about the type to the request. That is to say, in such a case the request may comprise an indication indicating that the type of the NFInstanceID of NF 102 is the SPIFFE identity type, i.e., an explicit indication. Also for NRF_NFDiscovery requests, URI query parameters (see TS 29.510, clause 6.2.3.2.3.1 for details) and/or 3gpp-Sbi-Discovery and other custom headers (see TS 29.500, clause 5.2.3.2) may be extended to cover structured NFInstanceID (e.g., SPIFFE ID based) based NFDiscovery requests as well. Such extension may be used also for 3gpp-Sbi-Binding, 3gpp-Sbi-Producer-Id, 3gpp-Sbi-Oci and 3gpp-Sbi-Lci etc.

At step 230, NRF 104 may determine the type of the NFInstanceID of NF 102 from the set of instance identity types, possibly based on the received request for example. NRF 104 may also determine the NFInstanceID of NF 102 based on the string associated with the NFInstanceID of NF 102 and the type of the NFInstanceID of NF 102. That is to say, NRF 104 may interpret the string using the type. For example, if the type of the NFInstanceID of NF 102 is the UUID, NRF 104 may interpret the string by assuming that the string is in the form of the UUID, as defined in IETF RFC 4122 for example. Similarly, if the type of the NFInstanceID of NF 102 is the SPIFFE identity type, NRF 104 may interpret the string by assuming that the string is in the form of the SPIFFE identity type, see the website "https://github.com/spiffe/spiffe/blob/master/standards/SPIFFE-ID.md" (retrieved on Jul. 6, 2020) for example. In some embodiments, depending on how the SPIFFE IDs are allocated (structured), the SPIFFE ID may contain some additional information from the NFProfile or NFProfile.nfService[n] as defined in TS 29.510; e.g., apiRoot for NF producer can be a part of the SPIFFE ID.

In some embodiments, NRF 104 may determine the type of the NFInstanceID of NF 102 based on an implicit indication from NF 102. NRF 104 may receive the request and determine that the request does not comprise an indication about the type of the NFInstanceID of NF 102. Based on such determination, NRF 104 may determine that the type of the NFInstanceID is the UUID identity type. In some embodiments, NRF 104 may receive the request comprising an indication indicating that the type of the NFInstanceID of NF 102 is the SPIFFE identity type and then use the explicit indication.

NRF 104 may use the determined NFInstanceID of NF 102 for various actions, depending on the request of NF 102. For example, if the request is an access token request, NRF 104 may perform validation procedures using the determined NFInstanceID of NF 102. For instance, NRF 104 may check that NFInstanceID of NF 102 is in a list of NF instances registered at NRF 104. After completing the validation procedures successfully, NRF 104 may for example create an access token and include the string associated with the NFInstanceID of NF 102 to an access token response. In some embodiments, NF 102, such as an NF consumer requesting access tokens, may not be registered to NRF 104 (only NF producers register their NF services) but the NFc needs to be trusted by NRF 104 in order to be able to grant the access tokens. For example with R16 Option D, service authorization may be delegated to SCP, so in such a case NF 102 can also be SCP for a specific NFc instance. The SPIFFE ID may be used for access tokens for the SCP or for the requester NF consumer (instance), or both.

At step 240, NRF 104 may transmit a response to NF 102. The response may depend on whether the NFInstanceID of NF 102 was found in the list of NF instances registered at NRF 104. The response may indicate that the request is accepted if the NFInstanceID of NF 102 was found in the list of NF instances registered at NRF 104 but if the NFInstanceID of NF 102 was not found in the list of NF instances registered at NRF 104, the response may indicate that the request is denied.

In some embodiments, NFs operating in accordance with Rd-15 or Rel-16 3GPP standard specifications may use UUID v4 as the type of the NFInstanceID. However, in some embodiments UUID v5 may be used as well, e.g., for implementations.

In some embodiments, for backward compatibility, NRF 104 may be able to determine a release of a target NF producer, or a requester NF consumer/SCP, and encode an access token appropriately. If an indication about the type of the NFInstanceID of NF 102 is missing, implicitly it means it is given in UUID type. For NF producers, if they support the SPIFFE ID as NFInstanceID, then an indication about that may be included in NFProfile.nfInstanceId, but for backwards compatibility both UUID and SPIFFE may be needed. For NF consumers, if they indicated the UUID as NFInstanceID (of the NF consumer) and/or requested specific UUID instead of the SPIFFE ID for the targetNfInstanceId in an access token request, or used UUIDs in "sub" for Subject, "aud" for Audience in access token claims, then those are most likely not using the SPIFFE concepts.

In some embodiments, the NFInstanceID of NF 102, which may be based on the string associated with the NFInstanceID of NF 102 and the type of the NFInstanceID of NF 102, may be exploited in an identity of a NF service set. For example, NFServiceSetId with "set<Set ID>.sn<Service Name>.nfi<NF Instance ID>0.5gc.mnc<MNC>.mcc<MCC>" may be defined in the 3GPP standard specification TS 29.571 (clause 5.4.2) and TS 23.003 (clause 28.13) may be updated to allow other identity types, i.e., the set of instance identity types, to be used as well. If type of the NFInstanceID of NF 102 in "nfi<NF Instance ID>" is missing, it may implicitly mean that the UUID type is used.

According to some embodiments of the present invention, some changes may be made to 3GPP standard specifications. For instance, NfInstanceId (String uniquely identifying a NF instance. The type of the NF Instance ID shall be a Universally Unique Identifier (UUID) version 4, as described in IETF RFC 4122 [15]) may be absent in the 3GPP TS 29.571 standard specification, Table 5.3.2-1 "Simple Data Types" in section 5.3.2.

Alternatively, or in addition, section 5.3.3 (Enumerations) in the 3GPP TS 29.571 standard specification may comprise Enumeration: NFInstanceType and the following table:

| Enumeration value | Description |
| --- | --- |
| "UUID" | UUID |
| "SPIFFEID" | Spiffe Id |
| "OTHERS" | String |

Alternatively, or in addition, section 5.3.4 (Structured Data Types) in the 3GPP TS 29.571 standard specification may comprise Enumeration: NFInstanceType and the following table:

| Attribute name | Data type | P | Cardinality | Description |
| --- | --- | --- | --- | --- |
| InstanceId | String | M | 1 | String uniquely identifying a NF instance. The format of the NF Instance ID shall be either a Universally Unique Identifier (UUID) version 4 or version 5, as described in IETF RFC 4122 [15] or a SPIFFE Id as described in <https://spiffe.io/spiffe/>. |
| InstanceIdFormat | NfInstanceIdType | M | 1 | Identifies the type of ID |

Figure 3:
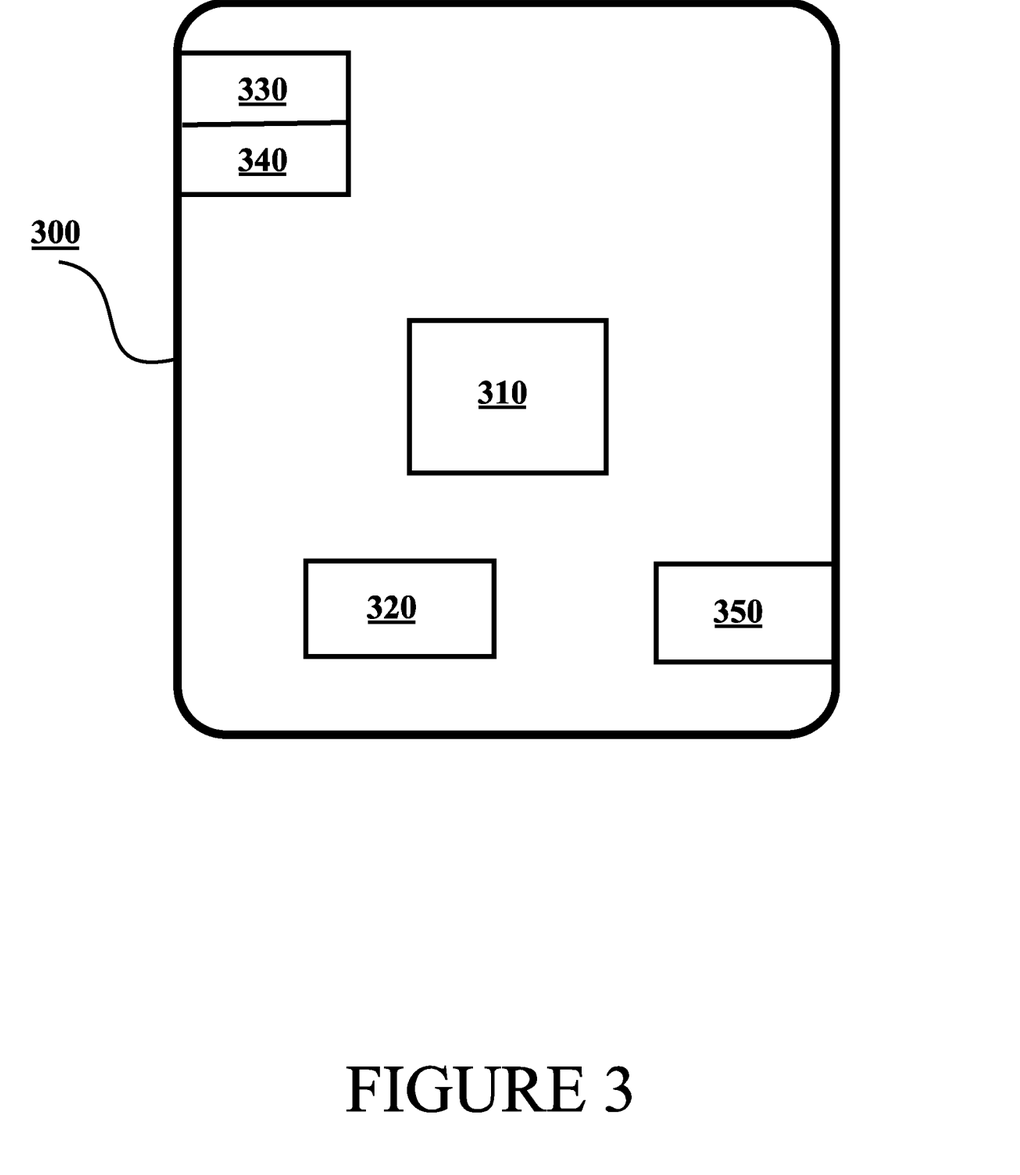
FIG. 3 illustrates an example apparatus capable of supporting at least some example embodiments.

FIG. 3 illustrates an example apparatus capable of supporting at least some example embodiments. Illustrated is device 300, which may comprise, for example, NF 102 or NRF 104, or a device controlling functioning thereof. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. Processor 310 may comprise at least one Application-Specific Integrated Circuit, ASIC. Processor 310 may comprise at least one Field-Programmable Gate Array, FPGA. Processor 310 may comprise an Intel Xeon processor for example. Processor 310 may be means for performing method steps in device 300, such as determining, causing transmitting and causing receiving. Processor 310 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular standard, such as a standard defined by the 3GPP. Transmitter 330 may comprise more than one transmitter. Receiver 340 may comprise more than one receiver. Transmitter 330 and/or receiver 340 may be configured to operate in accordance with a suitable communication standard.

Device 300 may comprise User Interface, UI, 350. UI 350 may comprise at least one of a display, a keyboard, a touchscreen, a vibrator arranged to signal to a user by causing device 300 to vibrate, a speaker and a microphone. A user may be able to operate device 300 via UI 350, for example to configure device 300 and/or functions it runs.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. In some example embodiments, device 300 lacks at least one device described above. For example, device 300 may not have UI 350.

Processor 310, memory 320, transmitter 330, receiver 340 and/or UI 350 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
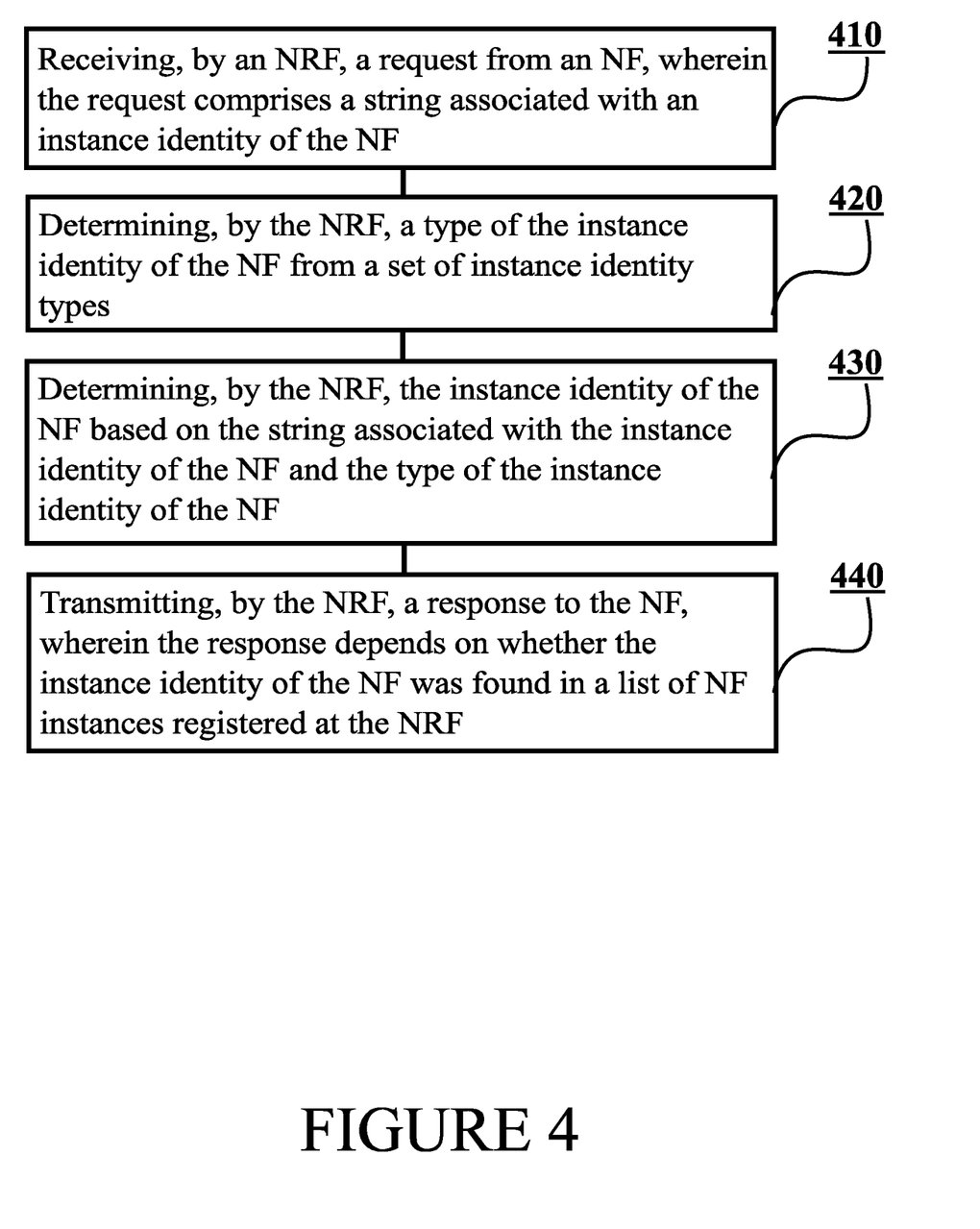
FIG. 4 illustrates a flow graph of a first method in accordance with at least some example embodiments.

FIG. 4 is a flow graph of a first method in accordance with at least some example embodiments. The phases of the illustrated first method may be performed by NRF 104, or by a control device configured to control the functioning thereof, possibly when installed therein.

The first method may comprise, at step 410, receiving, by a network repository function, a request from a network function, wherein the request comprises a string associated with an instance identity of the network function. The first method may also comprise, at step 420, determining, by the network repository function, a type of the instance identity of the network function from a set of instance identity types. Moreover, the first method may comprise, at step 430, determining, by the network repository function, the instance identity of the network function based on the string associated with the instance identity of the network function and the type of the instance identity of the network function. Finally, the first method may comprise, at step 440, transmitting, by the network repository function, a response to the network function, wherein the response depends on whether the instance identity of the network function was found in a list of network function instances registered at the network repository function.

Figure 5:
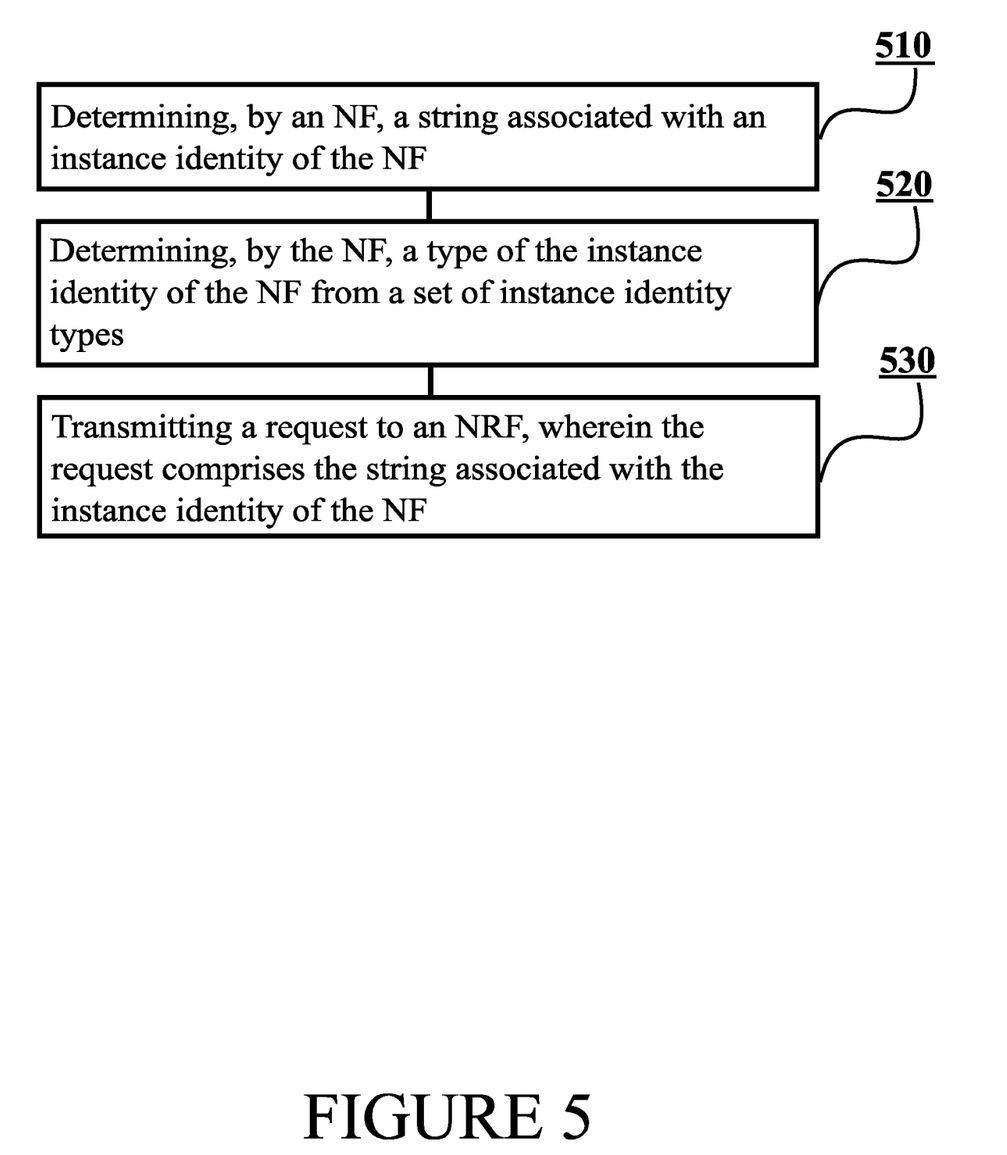
FIG. 5 illustrates a flow graph of a second method in accordance with at least some example embodiments.

FIG. 5 is a flow graph of a second method in accordance with at least some example embodiments. The phases of the illustrated second method may be performed by NF 102, or by a control device configured to control the functioning thereof, possibly when installed therein.

The second method may comprise, at step 510, determining, by a network function, a string associated with an instance identity of the network function. The second method may also comprise, at step 520, determining, by the network function, a type of the instance identity of the network function from a set of instance identity types. Finally, the second method may comprise, at step 530, transmitting a request to a network repository function, wherein the request comprises the string associated with the instance identity of the network function.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, such as, for example, NF 102 or NRF 104, or a device controlling functioning thereof, may comprise means for carrying out the example embodiments described above and any combination thereof.

In an example embodiment, a computer program may be configured to cause a method in accordance with the example embodiments described above and any combination thereof. In an example embodiment, a computer program product, embodied on a non-transitory computer readable medium, may be configured to control a processor to perform a process comprising the example embodiments described above and any combination thereof.

In an example embodiment, an apparatus, such as, for example, NF 102 or NRF 104, or a device controlling functioning thereof, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the example embodiments in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application at least in 5G core networks, wherein it is desirable to enhance identification, and possibly in other core networks in the future as well.

Acronyms List

3GPP 3rd Generation Partnership Project
AF Application Function
AMF Access and Mobility Function
AUSF Authentication Server Function
ID Identity
NEF Network Exposure Function
NF Network Function
NFc NF Consumer
NFp NF Producer
NRF Network Repository Function
NSSF Network Slice Selection Function
NWDAF Network Data Analysis Function
OAM Operations Administration and Maintenance
PCF Policy Control Function
SBA Service-Based Architecture
SMF Session Management Function
UDM Unified Data Management
VNF Virtualized Network Function

REFERENCE SIGNS LIST

| | |
|---|---|
| 102 | NF |
| 104 | NRF |
| 210-240 | Steps of the process of FIG. 2 |
| 300-350 | Structure of the apparatus of FIG. 3 |
| 410-440 | Phases of the first method in FIG. 4 |
| 510-530 | Phases of the first method in FIG. 5 |

The invention claimed is:

1. A method, in a network repository function, comprising:
receiving a request from a network function, wherein the request comprises a string associated with an instance identity of the network function;
determining a type of the instance identity of the network function from a set of instance identity types comprising different instance identity types;
determining the instance identity of the network function based on the string associated with the instance identity of the network function and the type of the instance identity of the network function; and
transmitting a response to the network function, wherein the response depends on whether the instance identity of the network function was found in a list of network function instances registered at the network repository function,
wherein the set of instance identity types comprises an identity type for service mesh technologies, and
wherein the identity type for service mesh technologies comprises a Secure Production Identity Framework for Everyone, SPIFFE, identity type,
wherein the network function includes an NFInstanceID of the network function in the format of UUID for backward compatibility or in the format of SPIFFE ID, wherein the SPIFFE ID covers trust domain and locality, UUIDv4/v5, NF Type, and service names as part of the SPIFFE workload identity in SPIFFE Verifiable Identity Document, SVID,
wherein a certificate of the network function includes the assigned NFInstanceID of the network function or multiple NFInstanceIDs of the network function if applicable for a target deployment architecture, and wherein the network function instance includes multiple SPIFFE IDs.

2. An apparatus comprising at least one processor; and at least one memory including computer program code, the at least one memory and the computer program code configured to, with the at least one processor, cause the apparatus at least to:
receive, by a network repository function, a request from a network function, wherein the request comprises a string associated with an instance identity of the network function;
determine, by the network repository function, a type of the instance identity of the network function from a set of instance identity types comprising different instance identity types;
determine, by the network repository function, the instance identity of the network function based on the string associated with the instance identity of the network function and the type of the instance identity of the network function; and
transmit, by the network repository function, a response to the network function, wherein the response depends on whether the instance identity of the network function was found in a list of network function instances registered at the network repository function,
wherein the set of instance identity types comprises an identity type for service mesh technologies, and
wherein the identity type for service mesh technologies comprises a Secure Production Identity Framework for Everyone, SPIFFE, identity type,
wherein the network function includes an NFInstanceID of the network function in the format of UUID for backward compatibility or in the format of SPIFFE ID, wherein the SPIFFE ID covers trust domain and locality, UUIDv4/v5, NF Type, and service names as part of the SPIFFE workload identity in SPIFFE Verifiable Identity Document, SVID,
wherein a certificate of the network function includes the assigned NFInstanceID of the network function or multiple NFInstanceIDs of the network function if applicable for a target deployment architecture, and wherein the network function instance includes multiple SPIFFE IDs.

3. The apparatus according to claim 2, wherein the type of the instance identity of the network function defines an identity type to be used for interpreting the string associated with the instance identity of the network function.

4. The apparatus according to claim 2, wherein the set of instance identity types comprises a Universally Unique Identifier, UUID, identity type.

5. The apparatus according to claim 2, wherein the type of the instance identity of the network function is determined based on the request.

6. The apparatus according to claim 1, wherein the request comprises an indication indicating that the type of the instance identity of the network function comprises the SPIFFE identity type.

7. The apparatus according to claim 4, wherein the apparatus is further configured to determine, responsive to determining that the request does not comprise an indication about the type of the instance identity of the network function, that the type of the instance identity of the network function comprises the UUID identity type.

8. The apparatus according to claim 2, wherein the network function operates according to at least one standard specification defined by a 3rd Generation Partnership Project, 3GPP.

9. The apparatus according to claim 2, wherein the network function is in a core network of a cellular communication network.

10. An apparatus comprising at least one processor; and at least one memory including computer program code, the at least one memory and the computer program code configured to, with the at least one processor, cause the apparatus at least to:
  determine, by a network function, a string associated with an instance identity of the network function;
  determine, by the network function, a type of the instance identity of the network function from a set of instance identity types comprising different instance identity types; and
  transmit, by the network function, a request to a network repository function, wherein the request comprises the string associated with the instance identity of the network function,
  wherein the set of instance identity types comprises an identity type for service mesh technologies, and
  wherein the identity type for service mesh technologies comprises a Secure Production Identity Framework for Everyone, SPIFFE, identity type,
  wherein the network function includes an NFInstanceID of the network function in the format of UUID for backward compatibility or in the format of SPIFFE ID, wherein the SPIFFE ID covers trust domain and locality, UUIDv4/v5, NF Type, and service names as part of the SPIFFE workload identity in SPIFFE Verifiable Identity Document, SVID,
  wherein a certificate of the network function includes the assigned NFInstanceID of the network function or multiple NFInstanceIDs of the network function if applicable for a target deployment architecture, and wherein the network function instance includes multiple SPIFFE IDs.

11. The apparatus according to claim 10, wherein the type of the instance identity of the network function defines an identity type to be used for interpreting the string associated with the instance identity of the network function.

12. The apparatus according to claim 10, wherein the set of instance identity types comprises a Universally Unique Identifier, UUID, identity type.

13. The apparatus according to claim 10, wherein the type of the instance identity of the network function is to be determined based on the request.

14. The apparatus according to claim 10, wherein the request comprises an indication indicating that the type of the instance identity of the network function comprises the SPIFFE identity type.

15. The apparatus according to claim 12, wherein the apparatus is further configured to transmit, responsive to determining that the type of the instance identity of the network function comprises the UUID identity type, the request without the type of the instance identity of the network function.

16. The apparatus according to claim 10, wherein the network repository function is in a core network of a cellular communication network.

* * * * *